United States Patent [19]

Martinez

[11] Patent Number: 5,036,118
[45] Date of Patent: Jul. 30, 1991

[54] REINFORCED POLYMER COMPOSITIONS HAVING IMPROVED DISTINCTNESS OF IMAGE

[75] Inventor: Eloy C. Martinez, Lake Jackson, Tex.

[73] Assignee: The Dow Chemical Company, Midland, Mich.

[21] Appl. No.: 528,011

[22] Filed: May 23, 1990

Related U.S. Application Data

[63] Continuation-in-part of Ser. No. 259,214, Oct. 17, 1988, abandoned.

[51] Int. Cl.$^5$ ............ C08K 7/10; C08K 9/06; C08K 13/04; C08L 75/02; C08L 75/08
[52] U.S. Cl. .................... 523/212; 523/216; 524/449; 524/451; 524/456; 524/790; 524/875
[58] Field of Search ............ 523/212, 209, 216; 524/449, 451, 492-493, 789-792, 874-875

[56] References Cited

U.S. PATENT DOCUMENTS 2,614,055 10/1952 De Senarclens ............ 524/449
4,269,945 5/1981 Vanderhider et al. ............ 521/163
4,560,715 12/1988 Ueda et al. ............ 524/449
4,806,586 2/1989 Narcai ............ 524/449

FOREIGN PATENT DOCUMENTS 62-54755 3/1987 Japan .

OTHER PUBLICATIONS

"Mica as a Reinforcement for Polyurethan RIM", Plastics Compounding, vol. 9, No. 3, May/Jun. 1986, pp. 16-21.
Chem Abstracts 100(24): 19335m.
Chem Abstracts 107(6): 41480c.
Chem Abstracts 105(10);8003k.

Primary Examiner—Thurman Page
Assistant Examiner—Edward J. Webman

[57] ABSTRACT

Molded polyurethanes and/or polyureas are filled with a mica filler having a thickness of less than about 1.5 micrometer and an aspect ratio of greater than about 40. The surfaces of these compositions exhibit a distinctness of image when painted that is within about 10 DOI units of the distinctness of image of similarly painted steel. The compositions also exhibit improved physical properties.

25 Claims, No Drawings

REINFORCED POLYMER COMPOSITIONS HAVING IMPROVED DISTINCTNESS OF IMAGE

CROSS REFERENCE TO RELATED APPLICATION

This application is a continuation-in-part of Application Ser. No. 259,214, filed Oct. 17, 1988, now abandoned.

BACKGROUND OF THE INVENTION

This invention relates to reinforced polymers, more particularly to molded polyurethane and/or polyurea polymers which contain filler materials.

It is well known to employ various filler materials to modify the physical properties of polymeric materials. The use of such fillers is thoroughly described in, for example, *Handbook of Fillers and Reinforcements for Plastics*, Katz et al., eds., Van Nostrand Reinhold Company, New York (1978). Polyurethane and/or polyurea polymers having their physical properties modified by fillers are increasingly being used to replace metals. Of particular interest are certain automotive applications, especially automotive exterior body parts. Filled polymers offer several advantages in these applications. In particular, the parts are often better able to withstand minor impacts, such as are encountered in low speed collisions, without damage, and they may also exhibit decreased tendency to rust.

The filled polymers used in making these body parts preferably exhibit a demanding combination of physical properties. They should have good thermal properties over a wide temperature range, have good dimensional stability, be rigid enough to bear their own weight, be flexible-enough to withstand minor impacts without damage, and be relatively unaffected by extremes in weather conditions. Success in meeting most of the foregoing criteria has been achieved by using certain reinforced polymers.

However, when a filler is added to improve one or more physical properties, it also frequently undesirably affects other physical properties. For instance, some fillers added as reinforcing fillers to polyurethanes reduce the impact strength and/or diminish surface quality. Such effects are discussed, for instance, by Maik and Fisa in "Mica as a Reinforcement for Polyurethanes RIM", in *Plastics Compounding*, vol.9, no.3, May/June 1986, pp. 16-21. In that discussion it is noted that addition of certain glass flakes and mica fillers reduces the notched Izod Impact Strength of a polyurethane, from 3.45 to 3.89 for unfilled material to 1.76 to 1.96 for the same material containing about 20 percent by weight glass flake or certain phlogopite micas.

In spite of the lowering of impact strength observed when various mica fillers are used, certain micas have been suggested for use in polyurethanes. For instance, Japanese 62-54755 discloses mica having an average diameter of less than about 50 micrometers used in polyurethane in an amount of from about 5 to 25 percent by weight. Japanese 58/2011829 discloses the use of flake fillers, including certain micas having a thickness of about 3 to 15 micrometers and aspect ratios (diameter to thickness) of 20 to 200, in polyurethanes. Similarly, certain mica flakes having a flake diameter less than about 50 micrometers are used in polyurethanes, as described in Japanese 85/195600. In general, when mica is used in polyurethanes and/or polyureas, particularly reaction injection molded polyurethanes and/or polyureas, it significantly reduces the impact strength of the final product.

Filled polymers also often have relatively poor surface qualities in comparison with metals. Metals provide a characteristically mirror-like surface after painting. Unfilled polymers often approach or equal the surface qualities of metals, but reinforced or extended polymers usually are significantly inferior in this respect. Because surface appearance, particularly of a painted surface, is of major importance in some applications to the consumer, it is highly desirable to provide a polymeric material having improved surface qualities. Flaked glass is an example of a reinforcing filler which can give impact strengths satisfactory for some applications, but which frequently gives poor surface properties.

Similarly, there are other applications wherein both impact strength and excellent surface appearance in a filled polymer is desired. Accordingly, it would be desirable to provide a filled polyurethane and/or polyurea polymer having desirable surface qualities as well as high impact strength.

SUMMARY OF THE INVENTION

In one aspect, the invention is a filled polymer composition comprising a polyurethane and/or polyurea matrix having dispersed therein a mica filler having an average thickness of less than about 1.5 micrometers and an aspect ratio of greater than about 40, the surface of said composition exhibiting a distinctness of image when painted that is within about 10 DOI units of the distinctness of image of similarly painted steel.

In yet another aspect, the invention is a filled polymer composition comprising a polyurethane and/or polyurea matrix having dispersed therein a muscovite mica filler having an average thickness of less than about 1.5 micrometers and an aspect ratio of greater than about 40, the surface of said composition exhibiting a distinctness of image when painted that is within about 10 DOI units of the distinctness of image of similarly painted steel.

In yet another aspect, this invention is a filled polymer composition comprising a polyurethane and/or polyurea matrix having dispersed therein a mica filler which is delaminated such that the filled polymer composition retains a notched Izod impact strength of at least about 2.5 ft.-lb/in. and a surface exhibiting a distinctness of image when painted that is within about 10 DOI units of the distinctness of image of similarly painted steel.

DESCRIPTION OF THE PREFERRED EMBODIMENTS

In this invention, a molded polymeric material having good physical properties and surface qualities is obtained with the use of a mica filler. The mica filler is advantageously highly delaminated. "Delaminated" as used herein means that the layers of the mica are separated, one from another. The mica is advantageously delaminated such that, when used in a polyurethane and/or polyurea composition, the composition retains both impact strength and excellent surface qualities, especially of a painted surface. Delamination advantageously produces relatively thin particles, preferably particles having an average thickness of less than about 1.5 micrometer, more preferably less than about 1 micrometer, most preferably less than about 0.8 micrometer, as determined by measurement of particle images produced by scanning electron microscopy. Delamination also preferably produces particles having generally smooth, rounded, perimeter contours of their larger surfaces (faces). Such contours are visually observable by SEM.

Impact strengths discussed herein are advantageously determined according to the Gardner Impact test, ASTM D-3029-84. Alternatively, the procedure of ASTM D-256-81, using notched samples as described therein, is suitable for determining impact strength. Such impact strengths are referred to as notched Izod impact strengths. Other methods within the skill in the art for determining impact strength are also suitably used. When mica is used as a filler according to the practice of the present invention, particularly in a molded polyurethane or polyurea composition, the notched Izod impact strength is advantageously at least about 2.5, preferably at least about 3, more preferably at least about 3.5 ft.-lb./in. Advantages of the invention are frequently even more evident where the impact strength is measured by the Gardner method, for which the sample is not notched. The Gardner impact strength of a composition of the invention is preferably at least about 2.5, more preferably at least about 3.5, and most preferably at least about 4 ft.-lb. at 73° F.

Surface quality improvement is one advantage attained in the practice of the present invention. A molded article made according to this invention exhibits surprisingly good surface characteristics, compared to a similar article made using flaked glass fillers, milled glass fillers, wollastonite, mica particles having characteristics different from the mica particles used in the practice of the invention, and other alternative fillers. To measure surface quality those skilled in the art commonly use a "distinctness of image" (DOI) test on painted samples. For this test a DORIGON* DOI meter model D47-6 can preferably be used. (*DORIGON is a trademark of Hunter Associates Laboratory, Inc.)

Mica fillers used in the practice of the invention preferably have aspect ratios of greater than about 40, more preferably from about 50 to about 250, and most preferably from about 50 to about 100. The aspect ratio is the ratio of a mica platelet's largest dimension to its smallest dimension. In the practice of the present invention it is preferred that the smallest dimension be the thickness of the platelet.

Any particle size of mica which produces a polyurethane and/or polyurea having the desired physical properties is suitable for use in the practice of the invention. Preferably, however, the weight average particle size as determined by the procedure of ASTM D 185-78 (as applied to muscovite mica as described by ASTM D 607-82) is from about 10 to about 200, more preferably from about 20 to about 70, and most preferably from about 35 to about 45 micrometers. The weight average particle size is alternatively determined by measuring laser light diffraction of samples dispersed in water according to operating instructions provided by manufacturers of instruments for making such measurements. Particle size is preferably calculated from such measurements using the Fraunhofer diffraction theory. Such a procedure is under consideration by ASTM Committee E-29 on Particle Size Analysis.

Many types of mica are available and can be used in the practice of the invention. Muscovite mica is, however, preferred. Muscovite mica is a potassium aluminum aluminosilicate, predominantly $K_2Al_4((Al_2Si_6O_{20})(OH)_4$. Such a mica is commercially available from several suppliers and is exemplified by Alsibronz Wet Ground Mica from Franklin Minera Products Muscovite MICA C-1000 from KMG Minerals: and Aspraloc 100 mica, commercially available from J. M. Huber Corporation, the latter being preferred in the practice of the invention.

The mica is also advantageously relatively pure. Preferably, there is present less than about 5 weight percent sand, silica and/or other abrasive materials in the mica. More preferably, there is less than about 1 weight percent of such impurities, and most preferably less than about 0.5 weight percent.

The mica filler is preferably present in an amount sufficient to provide enhanced physical properties to the polymer composition. In general, desirable physical properties are obtained when the mica filler constitutes preferably from about 5 to about 70 weight percent, more preferably from about 15 to about 50 weight percent, and most preferably from about 25 to about 30 weight percent of the polymer composition. Where the filled polymer composition is to be used for replacement of steel, such as in automobile body panels, it is preferred that the mica constitute at least about 20 percent by weight in order to achieve a balance of desirable physical properties and surface properties.

It is often advantageous, although not essential, to employ mica which has been "compatibilized", i.e., rendered more compatible with the polymer matrix, either through chemical modification of the filler itself or by coating or treating the surface of the filler with a material which promotes adhesion of the mica filler to the polymer matrix. Various types of surface treating materials are known, and their use herein will be apparent to those skilled in the relevant art. Suitable surface treating materials include fatty acid salts such as calcium stearate: organic esters of fatty esters, including esters of a fatty acid and a polyhydric alcohol such as is described in U.S. Pat. No. 4,126,593, incorporated herein by reference: silane coupling agents, including amino-, chloro-, isocyantoand epoxy-silane coupling agents, as described, for example, in U.S. Pat. Nos. 4,474,900, 4,582,887, 4,585,850 and 4,607,090, and James R Steinmetz, "Silanes", Modern Plastics Encyclopedia '88, McGraw-Hill, New York (1987), all incorporated by reference: mixtures thereof: and the like. Titanate coupling agents, including, for example, those of the type described in Salvatore J. Monte, "Titanates", Modern Plastics Encyclopedia '88, McGraw-Hill, New York (1987), incorporated herein by reference, are also useful herein. Of these surface treating agents, the silanes, particularly the amino-silanes, are preferred. Such surface treating agents are advantageously used in a minor amount based on the weight of the filler material, such as from about 0.1 to about 10, preferably about 1 to about 2, weight percent based on the weight of the filler. The use of surface treatments may tend to reduce the impact strength of the filler polymer, so it is generally desirable to use the smallest quantity thereof which provides improved bonding of the polymer to the filler.

The polyurethane and/or polyurea polymer used herein advantageously is elastomeric, and has a plurality of urethane or urea linkages, or mixtures of urethane and urea linkages. This polymer is also advantageously a thermosetting polymer, although thermoplastic polyurethanes are also useful in some applications where thermoplasticity is desired. The polymer is advantageously characterized in having a flexural modulus (filled) of at least about 25,000 psi, preferably at least about 35,000, more preferably from about 50,000 to about 300,000, and most preferably from about 50,000 to about 100,000 psi. For use in automobile body panels, the flexural modulus (of a filled composition) is preferably at least about 150,000 psi, and more preferably from about 200,000 to about 400,000 psi. The resulting polymer is also preferably noncellular or microcellular, more preferably having a bulk density (filled) of from about 0.8 to about 1.6 g/cc, and most preferably about 1 to about 1.35 g/cc.

These polyurethanes are advantageously prepared by reacting a relatively high equivalent weight active hydrogen-containing material with a polyisocyanate, usually in the presence of a chain extender. The relatively high equivalent weight active hydrogen-containing material is advantageously one such as is described, for example, in U.S. Pat. No. 4,390,645, incorporated herein by reference. Preferably, it has an equivalent weight of from about 700 to about 3000, more preferably from about 1000 to about 2500, and most preferably from about 1000 to about 2200, based on the number of isocyanate-reactive groups. It is also preferably a polyether or polyester nominally containing from about 1.7 to about 4. more preferably from about 1.8 to about 3, and most preferably from about 1.8 to about 2.8 hydroxyl groups or primary or secondary amine groups, or mixture of such groups, per molecule. Preferably, the isocyanate reactive groups are primary hydroxyl groups: primary or secondary aliphatic amine groups: or primary or secondary aromatic amine groups. It is also preferred that the relatively high equivalent weight active hydrogen-containing material be a polyether, most preferably a polymer of propylene oxide or a mixture thereof with a minor amount of ethylene oxide. Such amine-terminated polyethers and their use in making polyurethanes are described, for example, in U.S. Pat. Nos. 4,444,910 and 4,565,645, and European Patent Publication 81,701. Mixtures of primary hydroxyl-terminated polyether polyols and aminated polyethers are particularly preferred.

Either aliphatic or aromatic polyisocyanates be used in this invention. Suitable aliphatic polyisocyanates include ethylene diisocyanate, 1,4-tetramethylene diisocyanate, 1,6-hexamethylene diisocyanate, 1,12-dodecane diisocyanate, cyclobutane-1,3--diisocyanate, cyclohexane-1,3- and -1,4-diisocyanate, 1,5-diisocyanato-3,3,5-trimethylcyclohexane, 2,4- and/or 2,6-hexahydrotoluene diisocyanate, perhydro-2,4'- and/or- 4,4'-diphenylmethane diisocyanate ($H_{12}MDI$), isophorone diisocyanate, mixtures thereof and the like.

Suitable aromatic polyisocyanates include, for example, 2,4- and/or 2,6-toluene diisocyanate (TDI), 2,4'- and/or 2,6'-diphenylmethane diisocyanate (MDI), 1,3- and 1,4-phenylene diisocyanate, 1,5-naphthylene diisocyanate, triphenylmethane-4,4',4''-triisocyanate, polyphenylpolymethylene polyisocyanates, mixtures thereof and the like.

In addition, derivatives and prepolymers of the foregoing polyisocyanates can also be employed in preparing the polyurethanes and/or polyureas useful in the present invention. For example, polyisocyanate derivatives or prepolymers containing urethane, carbodiimide, allophanate, isocyanurate, acylated urea, biuret, ester and similar groups are useful herein. Of these, prepolymers of TDI and MDI, and also the so-called "liquid MDI" products, which contain carbodiimide groups and have an equivalent weight of from about 130 to about 150, are of particular significance.

Of the foregoing polyisocyanates, TDI, MDI, isophorone diisocyanate, $H_{12}MDI$, hexamethylene diisocyanate, cyclohexane diisocyanate and derivatives thereof are preferred. TDI, MDI and derivatives of MDI are more preferred. MDI and its derivatives are most preferred.

The polyisocyanate is used in an amount sufficient to provide an isocyanate index of from about 0.6 to about 2, preferably from about 0.9 to about 1.25, more preferably from about 0.95 to about 1.1. It is preferred that the index be high enough to allow complete cure. The "isocyanate index" is the ratio of isocyanate groups to active hydrogen-containing groups in the mixture which reacts to form the polymer.

Chain extenders are advantageously used and can be used in particular to improve the flexural modulus and high temperature properties of the polymer. "Chain extenders" as used herein refers to compounds having two active hydrogen-containing groups per molecule and an equivalent weight from about 31 to about 300, preferably from about 31 to about 150. Hydroxyl-containing chain extenders include the alkylene glycols and glycol ethers such as ethylene glycol: 1,3-propylene glycol 1,4-butylene glycol; 1,6-hexamethylene glycol; diethylene glycol; triethylene glycol; dipropylene glycol tripropylene glycol: 1,4-cyclohexanedimethanol mixtures thereof: and the like. Amine chain extenders include diethyltoluene diamine and other stearically hindered aromatic diamines such as are described in U.S. Pat. No. 4,218,510: phenylene diamine: methylene bis(o-chloroaniline): methylene bis(aniline): sodium chloride-blocked methylene bis(aniline) toluene diamine: aromatic diamines which are substituted on at least one of the carbon atoms adjacent to the amine groups with a lower alkyl group mixtures thereof and the like. Diethyltoluene diamine and other stearically hindered aromatic diamines are preferred due to their reactivity and properties obtained with their use. When chain extenders are used they preferably comprise from about 5 to about 80, more preferably from about 25 to about 40, weight percent of the active hydrogen containing compounds.

Crosslinking agents can also be advantageously used in polyurethane polymer compositions filled according to the practice of the invention. "Cross-linking agents" as used herein refers to compounds having more than two, preferably from about 3 to about 8, more preferably from about 3 to about 4, active hydrogen-containing groups per molecule and an equivalent weight of from about 45 to about 300, preferably from about 45 to about 150. Hydroxyl-containing crosslinking agents include alkylene triols such as trimethylolpropane and glycerine: alkanolamines such as diethanolamine, triisopropanolamine, triethanolamine, and diisopropanolamine: adducts of from about 4 to about 8 moles of an alkylene oxide such as ethylene oxide or propylene oxide with ethylene diamine and the like: ammonia: polyamines such as methylene bis (o-chloroaniline), diethyl toluene diamine and ethylene diamine mixtures thereof: and the like. Diethyl toluene diamine and the adducts of alkylene oxides with ethylene diamine and similar amines are preferred crosslinkers in the practice of the present invention.

Examples of preferred polymers made using the foregoing isocyanates, high equivalent weight isocyanate-reactive materials, crosslinking agents and chain extenders are described, for example, in U.S. Pat. Nos. 4,374,210; 4,444,910; 4,218,510; 4,296,945; 4,689,356; 4,585,803 and European Patent Publication 81,701, all incorporated herein by reference. In a preferred embodiment, the selected components are processed in a reaction injection molding (RIM) process to form the desired polyurethane and/or polyurea polymer. Polyurea polymers as described in U.S. Pat. No. 4,444,910 and polyurethane-polyurea polymers as described in U.S. Pat. 4,269,945 are especially preferred. In such polyurethane-polyurea polymers, it is generally preferred that both a chain extender and a crosslinking agent be used, preferably in amounts from about 5 to about 70, more preferably from about 15 to about 35, percent based on the weight of the active hydrogen containing compounds. The ratio of chain extender to crosslinker is preferably from about 15:1 to about 1:1, more preferably from about 8:1 to about 1.5:1. The amounts of chain extenders and crosslinkers can be adjusted, as is well known to those skilled in the art, in order to achieve desirable flexural moduli and/or improved processing characteristics, such as ease of handling of freshly molded parts.

In addition to the components described before, other materials can also be used in the preparation of the polyurethane and/or polyurea composition of the present invention. A catalyst for the reaction of the precursor materials is preferably used. Although a wide variety of materials are known to those skilled in the art to be useful for this purpose, the tertiary amine and organometallic catalysts are preferred. Often the catalyst can be omitted, particularly when polyurea polymers are prepared, as taught in U.S. Pat. No. 4,433,067, incorporated herein by reference.

Exemplary tertiary amine catalysts include, for example, triethylenediamine: N-methyl morpholine; N-ethyl morpholine: diethyl ethanolamine: N-coco morpholine: 1-methyl-4-dimethylaminoethyl piperazine: 3-methoxy-N-dimethylpropylamine; N,N-diethyl-3-diethylaminopropylamine dimethylbenzyl amine: bis(2-dimethylaminoethyl)ether: mixtures thereof: and the like. Tertiary amine catalysts are advantageously employed in an amount of from about 0.01 to about 5, preferably from about 0.05 to about 2, parts per 100 parts by weight of the amine-terminated compound.

Exemplary organometallic catalysts include organic salts of metals such as tin, bismuth, iron, mercury, zinc, lead and the like, with the organotin compounds being preferred. Suitable organotin catalysts include dimethyltindilaurate, dibutyltindilaurate, stannous octoate, mixtures thereof and the like. Other suitable catalysts are taught, for example, in U.S. Pat. No. 2,846,408. Advantageously, from about 0.001 to about 0.5 part of an organometallic catalyst is used per 100 parts by weight of amine-terminated compound.

A blowing agent can optionally be employed in the present invention, but as stated before, it is preferred that the polymer has a density of at least about 0.8 g/cc. The blowing agent can be any material which is capable of generating a gas under the conditions of the reaction of the selected polyisocyanate and polyol. Such materials include air, carbon dioxide, nitrogen, water, formic acid, low-boiling halogenated alkanes, finely divided solids, the so-called "azo" blowing agents such as azobis(formamide), mixtures thereof and the like. Preferred are water, the low-boiling halogenated alkanes, and mixtures thereof.

In addition to the foregoing, other optional additives which are useful herein include surfactants, mold release additives, plasticizers, catalysts, reaction modifiers, pigments, colorants, additional fillers and the like.

While additional or auxiliary fillers can be used herein in conjunction with the mica filler, it is preferred that neither its nature nor its amount be such that the impact strength of the final composition is less than 50 percent of the impact strength of a similar composition containing mica alone. More preferably the impact strength is at least about 75 percent of that of a composition containing only mica, and most preferably at least about 90 percent. Suitable additional fillers include fillers conventionally known to the skilled practitioner, including clays, inorganic carbonates, ground rock, glass, fibrous materials and the like. The additional filler is preferably of any shape and size suitable to produce a polyurethane or polyurea having desirable properties and qualities, in particular as to surface appearance.

Particularly suitable additional fillers are inorganic fillers having an aspect ratio of less than about 4 and an average particle size of less than about 10 micrometers, preferably less than about 5 micrometers, more preferably less than about 2 micrometers, and most preferably from about 0.5 to about 2 micrometers. Such fillers can optionally be surface treated as described above. Among the inorganic fillers useful as supplemental filler are talc, calcium carbonate, feldspar, wollastonite and nepheline syenite, with talc and wollastonite being most preferred. Any of the commonly available talc products are useful herein, such as Montana talc, California talc, Vermont talc, New York talc and the like, but those such as Montana talc, which contain relatively low levels of impurities, are preferred. It is further preferred that the loss on ignition (LOI) value of the selected additional filler or fillers be about 10 or less, and more preferably about 5 or less. Also highly preferred are talc products which have a maximum particle size of about 20 micrometers or less, more preferably about 10 micrometers or less.

In such combinations the total fillers preferably comprise less than about 70 percent, more preferably less than about 50 percent, most preferably less than about 40 percent, by weight of the polymer composition containing the fillers. While the mica filler is suitably any portion of the filler combination, it preferably comprises less than about 95 percent, more preferably from about 60 to about 95 percent, and most preferably from about 65 to about 75 percent by weight of the total filler. Thus, it is preferred that the additional filler comprises at least 5 percent, more preferably from about 5 to about 40 percent, and most preferably from about 25 to about 35 percent, by weight of the total filler. Combinations of the mica and additional inorganic filler are preferred for polyurethane compositions in particular.

In making the filled polymer composition, the filler component, comprising mica and, if desired, additional fillers, is preferably intermixed with the polyurethane and/or polyurea polymer in any convenient manner which provides for a substantially homogeneous dispersion of the filler component. In making thermosetting polyurethane and/or polymers from liquid precursor materials, it is generally convenient to incorporate the filler into one or more of the precursor materials. The precursor is then reacted with the remaining precursor materials to form the final composition of the present invention. For example, the filler can be incorporated into the polyisocyanate components, or, preferably, into one or more of the isocyanate-reactive components.

Although the particular molding process is not considered critical to the present invention and conventional casting techniques can be used, it is preferred to prepare molded articles by means of reaction injection molding, a process in which the isocyanate-reactive materials are mixed under high pressure with the polyisocyanate composition and rapidly injected into the closed mold. This process is suitable for rapidly producing molded parts.

The molded parts prepared from the compositions of the present invention can be painted, i.e., a desired colorant, protective, or other type of film can be applied thereto. Suitable films include, for example, acrylic basecoat, topcoat and clearcoat paints based on urethanes, polyesters, melamine-formaldehyde and the like: lacquers: enamels: mixtures thereof: and the like. These paints can be applied over any of various known primers, including for example urethane- and polyester-based acrylics, and/or primer surfacers. Commercial film-producing materials used in the automotive industry are particularly preferred. Because the filled compositions of this invention exhibit improved surface quality, an improvement in distinctness of image (DOI) can be measured using the techniques described above. Since the final distinctness of image values attained by the compositions of the present invention are a function of the composition and application of the paint or other films, as well as of the filled polymer compositions themselves, comparative DOI assessments are advantageously based upon steel painted with identical film systems, including, for example, identical primers, primer surfacers, basecoats, topcoats, clearcoats and the like, using closely similar application techniques for each. Such steel is termed "similarly painted steel" herein.

Preferably the compositions of the present invention attain a final DOI value within about 10 DOI units of the distinctness of image measurement of similarly painted steel, i.e., steel painted with the same primer, primer surfacer, basecoat, topcoat, and/or clearcoat materials in the same film thickness, using closely similar application methods. More preferably the final DOI value is within about 5 DOI units, and most preferably the final DOI value is within about 2 DOI units. Because of the excellent surface properties, the molded compositions of the present invention are useful in applications which require cosmetically appealing finishes, such as exterior automobile body parts, particularly automobile body panels.

The following examples are given to more fully illustrate the present invention, but are not intended to be, nor should they be construed as being, limitative of the scope thereof. All parts and percentages are by weight unless otherwise indicated.

EXAMPLES 1 AND 2 AND COMPARATIVE SAMPLES A-D

A "B-side" formulation for a polyurethane-urea elastomer having a flexural modulus (unfilled) of about 85,000 is prepared by blending a mixture totaling about 100 parts, of: (1) a relatively high equivalent weight primary amine-terminated polyether and a relatively high equivalent weight primary hydroxyl-terminated polyether: (2) an isomeric mixture of diethyltoluene diamine; (3) an internal mold release agent: and (4) a mixture of amine and organotin catalysts. This formulation is reacted with a soft segment MDI prepolymer of the type described in U.S. Pat. No. 4,374,210, having an equivalent weight of 215, at an isocyanate index of 1.05. In the Examples and Comparative Samples described herein, one or more fillers, as described in Table I, are incorporated into the B-side formulation before the reaction with the prepolymer.

TABLE I

| SAMPLE OR COMPARATIVE SAMPLE | FILLER | |
|---|---|---|
| | Type | Amount, %[1] |
| A* | None | — |
| B* | Flaked Glass[2] | 20 |
| C* | Wollastonite[3] | 23 |
| D* | Phlogopite Mica[4] | 20 |
| 1 | Muscovite Mica[5] | 21 |
| 2 | Muscovite Mica/Talc[6] | 21/7.5 |

[1]Based on the total weight of the polyurethane.
[2]A 1/64" hammer milled glass, available as 737CB from Owens Corning Corporation.
[3]Wollastonite G, available from NYCO Corporation.
[4]A phlogopite mica available as SUZERITE* 200 from Marietta Resources International, Ltd., which has an aspect ratio of about 30, a particle size of about 50–75 micrometers, and contains 5–6 percent sand.
[5]ASPRALOK* 100, trademark of J. M. Huber, Corp., which has an aspect ratio of about 50–100, a particle size of about 37 to 44 micrometers, less than about 0.1 percent free sand or silica, and is coated with a proprietary organosilicon chemical.
[6]ASPRALOK* 100 (see note[5]), and MISTRON CYPRUBOND*, trademark of Cyprus Industrial Minerals Co.
*Not an example of the present invention.

The reaction is conducted in a reaction injection molding process on a standard reaction injection molding machine. The A-side and B-side components are injected into the mold at a temperature of 140° F., a mixing pressure of 2000 psi and a mold temperature of 175° F. Demold time is 30 seconds. The mold is a flat plaque having a thickness of 0.125 inch.

The molded plaques are then postcured at 325° F for an hour. The plaques are cut into 4-inch by 12-inch panels and are washed thoroughly to remove surface impurities and residual mold release agents remaining on the surface. Physical properties of certain of the samples are measured and are reported in Table II.

The DOI of the plaques is determined by first applying a conductive black primer to the plaques. The selected primer used is commercially available as HAP-1724G from PPG Industries, and is applied in two passes, each pass followed by flashing of the solvent. Total primer thickness is from about 0.8 to about 1.1 mils. The primer is then cured for 30 minutes at 250° F.

A black topcoat, commercially available as Inmont ESB 33J100, is then applied in three passes, each pass followed by flashing of the solvent, such that a total film thickness of from about 1.5 to about 2.0 mils is applied. This topcoat is cured for 17 minutes at 265° F.

Finally, the DOI is measured using conventional procedures, using the average of three readings taken at the top, middle and bottom of each plaque. DOI values are based on a comparison of the painted plaques of the Examples with similarly painted steel.

The physical properties and DOI measurements for each Example, Sample and Comparative Sample are as described in Table II.

For further comparison, in Table II the DOI for a UNIPRIME steel test panel is reported. A UNIPRIME steel test panel is a sample of similarly painted steel of the type used in making automobile body panels and is commercially available from Advanced Coatings Technologies. The steel is cold rolled and zinc phosphitetreated with a high film build (thickness) from about 1.1 to about 1.3 mils. It is left unpolished.

TABLE II

| PROPERTY | SAMPLE OR COMPARATIVE SAMPLE | | | | | | |
|---|---|---|---|---|---|---|---|
| | A* | B* | C* | D* | 1 | 2 | Steel* |
| Specific Gravity [1] | 1.06 | 1.22 | 1.30 | 1.27 | 1.20 | 1.29 | — |
| Flexural Modulus, [2] psi | 80,000 | 230,000 | 228,000 | 200,000 | 220,000 | 245,000 | — |
| Tensile Strength, [3] psi | 3500 | 4800 | 4500 | 3500 | 4000 | 4500 | — |
| Elongation, [3] % | 180 | 35 | 65 | 48 | 27 | 46 | — |
| IZOD Impact, [4] at 72° F. | 10.8 | 3.5 | 3.2 | 2.7 | 3.6 | 3.2 | — |
| Heat Sag, at 250° F./1 hr. [5] | 0.06 | 0.07 | 0.17 | 0.10 | 0.06 | 0.05 | — |
| Heat Sag, at 325° F./1 hr. [5] | >2 | 0.40 | 0.40 | 0.40 | 0.34 | 0.37 | — |
| DOI [6] | 96 | 72 | 84 | 80 | 94 | 93 | 97 |
| CLTE [7], $\times 10^{-6}$: | | | | | | | |
| −40° F. to 72° F. | 80 | 28 | 22 | 38 | 30 | 25 | — |
| 72° F. to 150° F. | 85 | 31 | 28 | 38 | 32 | 29 | — |
| 72° F. to 250° F. | 88 | 33 | 30 | 37 | 35 | 32 | — |

*Not an example of the present invention.
— No data available.
[1] ASTM D-792-66
[2] ASTM D-790-80 in lbs./in.² (psi).
[3] ASTM D-638-84.
[4] ASTM D-256-81.
[5] Determined at the stated temperature for 30 minutes with a 6"overhang, by ASTM D-3765-85 in inches.
[6] DOI is distinctness of image.
[7] Coefficient of linear thermal expansion as measured by ASTM D-696-79.

As can be seen from the data presented in Table II, the mica filler used according to the practice of the invention provides improved painted surface quality with minimal sacrifice of physical properties, particularly impact strength, when compared to the other filled polymers evaluated (Comparative Samples B*, C* and D*).

EXAMPLE 3 AND COMPARATIVE SAMPLE E

Polyurethane/polyurea polymer samples are prepared generally as described for Examples 1-2 and Comparative Samples A-D above, except that the filler of Example 3 is 22 weight percent of Muscovite mica, and the filler of Comparative Sample E is 20.5 weight percent of phlogopite mica.

Except as noted, physical properties are measured as in Example 1 and 2. The Gardner Impact Strength is determined by ASTM-D-3029-84. Physical properties and DOI measurements are shown in Table III.

TABLE III

| PROPERTIES | EXAMPLE 3 | COMPARATIVE SAMPLE E* |
|---|---|---|
| Specific Gravity | 1.225 | 1.27 |
| Flexural Modulus, psi | 230,000 | 200,000 |
| Tensile Strength, psi | 4,000 | 3320 |
| Elongation, % | 31 | 48 |
| IZOD Impact, in.-lb./in | | |
| at 73° F. | 40.0 | 30 |
| at −20° F. | 20.8 | — |
| Gardner Impact, in.-lb. | | |
| at 73° F. | 6.5 | 32 |
| at −20° F. | 8.5 | 3.6 |
| 6" Heat Sag, in. | | |
| at 250° F./1 hr. | 0.05 | 0.10 |
| at 325° F./1 hr. | 0.38 | 0.40 |
| HDT+, °F. at 66 psi | 325 | 318 |
| Wt. % Filler | 22.0 | 20.5 |
| DOI | 94–96 | 80–82 |
| CLTE in./in. °F. $\times 10^{-6}$ | | |
| at −40 to 72° F. | 26.8 | — |
| at 72 to 150° F. | 32.2 | — |
| at 72 to 250° F. | 35.0 | — |

*Not an example of the present invention.
+Heat distortion temperature, measured as described in ASTM D-1637-83.
— No data available.

What is claimed is:

1. A filled polymer composition comprising a polyurethane and/or polyurea matrix having dispersed therein a mica filler having a thickness of less than about 1.5 micrometers and an aspect ratio of greater than about 40, the surface of the composition exhibiting a distinctness of image when painted that is within about 10 DOI units of the distinctness of image of similarly painted steel.

2. The filled polymer composition of claim 1 wherein the mica filler has a thickness of less than about 1 micrometer.

3. The filled polymer composition of claim 1 wherein the mica filler has an aspect ratio from about 50 to about 250.

4. The filled polymer composition of claim 1 wherein the mica filler is surface treated.

5. The filled polymer composition of claim 4 wherein the mica filler is surface treated with an organosilicon compound.

6. The filled polymer composition of claim 1 wherein the composition contains from about 5 to about 70 weight percent mica filler.

7. The filled polymer composition of claim 6 wherein the composition contains at least about 20 weight percent mica filler.

8. The filled polymer composition of claim 1 wherein the composition has a notched Izod impact strength of at least about 2.5 ft.-lb./in.

9. The filled polymer composition of claim 1 wherein the surface of the composition exhibits a distinctness of image when painted within about 5 DOI units of similarly painted steel.

10. The filled polymer composition of claim 9 wherein the surface of the composition exhibits a distinctness of image when painted within about 3 DOI units of similarly painted steel.

11. The filled polymer composition of claim 1 wherein the polyurethane and/or polyurea is a reaction product of an aromatic polyisocyanate, an aromatic diamine or alkylene glycol chain extender, and a relatively high equivalent weight isocyanate-reactive material which is a primary hydroxyl-, primary amine- or secondary amine-terminated polyether having an average functionality of from about 1.8 to about 4 and an equivalent weight from about 1000 to about 2500.

12. The filled polymer composition of claim 11 wherein the composition has a notched Izod impact strength of at least about 2.5 ft.-lb./in.

13. The filled polymer composition of claim 11 wherein the surface of the composition exhibits a distinctness of image when painted that is within about 5 DOI units of the distinctness of image of similarly painted steel.

14. The filled polymer composition of claim 11 wherein the flexural modulus is at least about 150,000 lb./in.2.

15. The filled polymer composition of claim 1 further comprising an additional inorganic filler.

16. The filled polymer composition of claim 15 wherein the additional filler is talc, wollastonite or a mixture thereof.

17. The filled polymer composition of claim 16 wherein the additional filler is present in an amount from about 5 to about 40 percent by weight of the total filler.

18. A filled polymer composition comprising a polyurethane and/or polyurea matrix having dispersed therein a mica filler delaminated such that the filled polymer composition exhibits a notched IZOD impact strength of at least about 2.5 ft.-lb./in. and a surface having a distinctness of image when painted that is within about 10 DOI units of the distinctness of image of similarly painted steel.

19. The filled polymer composition of claim 18 wherein the mica filler has a thickness of less than about 1.5 micrometer.

20. The filled polymer composition of claim 18 wherein the mica filler has an aspect ratio of from about to about 250.

21. The filled polymer composition of claim 18 wherein the composition contains from about 5 to about 70 weight percent mica filler.

22. The polymer composition of claim 21 wherein the composition contains at least about 20 weight percent mica filler.

23. The filled polymer composition of claim 18 wherein the composition exhibits a distinctness of image when painted that is within about 5 DOI units of the distinctness of image of similarly painted steel.

24. The filled polymer composition of claim 18 wherein said polyurethane and/or polyurea is a reaction product of an aromatic polyisocyanate, an aromatic diamine or alkylene glycol chain extender, and a relatively high equivalent weight isocyanate-reactive material which is a primary hydroxyl-, primary amine- or secondary amine-terminated polyether having an average functionality of about 1.8 to about 4 and an equivalent weight from about 1000 to about 2500.

25. The filled polymer composition of claim 18 wherein in the mica filler is muscovite mica.

* * * * *

Adverse Decision in Interference

Patent No. 5,036,118, Eloy C. Martinez, REINFORCED POLYMER COMPOSITIONS HAVING IMPROVED DISTINCTNESS OF IMAGE, Interference No. 103,446, final judgment adverse to the patentee rendered November 30, 1999, as to claims 1-25.
*(Official Gazette November 28, 2000)*